United States Patent [19]

Schou, deceased et al.

[11] Patent Number: 4,959,233
[45] Date of Patent: * Sep. 25, 1990

[54] EMULSIFIER AND A METHOD FOR ITS PREPARATION

[75] Inventors: Herbert W. D. Schou, deceased, late of Juelsminde, by Gudrun Schou, heiress; Jack A. Dreyer, Horsens, both of Denmark

[73] Assignee: NEXUS ApS, Juelsminde, Denmark

[*] Notice: The portion of the term of this patent subsequent to May 31, 2005 has been disclaimed.

[21] Appl. No.: 19,245

[22] PCT Filed: May 29, 1986

[86] PCT No.: PCT/DK86/00059

§ 371 Date: Jan. 23, 1987

§ 102(e) Date: Jan. 23, 1987

[87] PCT Pub. No.: WO86/06937

PCT Pub. Date: Dec. 4, 1986

[30] Foreign Application Priority Data

May 31, 1985 [DK] Denmark ............... 2446/85

[51] Int. Cl.$^5$ .................. A23L 1/035; A23P 1/12
[52] U.S. Cl. .................... 426/443; 426/611; 426/654
[58] Field of Search ............ 426/611, 654, 443

[56] References Cited

U.S. PATENT DOCUMENTS

| | | | |
|---|---|---|---|
| 3,637,774 | 1/1972 | Babayan et al. | 426/654 |
| 4,456,627 | 6/1984 | Van Heteren et al. | 426/603 |
| 4,680,184 | 7/1987 | Seiden et al. | 426/654 |
| 4,748,027 | 5/1988 | Schou et al. | 426/96 |

FOREIGN PATENT DOCUMENTS

| | | | |
|---|---|---|---|
| WO8101286 | 5/1981 | PCT Int'l Appl. | |
| 1458568 | 12/1976 | United Kingdom | 426/611 |

OTHER PUBLICATIONS

Octacosanol-contg. aq. compsn., etc., Taiyo Kagaku KK, Derwent, Abstract No. J61263937.
Oil-in-water emulsion food prodn., etc., Knorr Shokuhin KK, Derwent, Abstract No. J60137260.
Stable whipping cream prepn., etc., Taiyo Chemical Ind KK, Derwent, Abstract No. J56131360.
Prepn. of whip cream, etc., Morinaga Milk KK, Derwent, Abstract No. J62118855.
Prepn. of low fat cream used for whipping, etc., Morinaga Milk KK, Derwent, Abstract No. J62228247.
Acidic oil-in-water emulsion for salad dressing, etc., Sakamoto Yakuhin Ko, Derwent, Abstract No. J60118164.
Feete-Seifen-Anstrichmittel, No. 3, 1980, R. Neissner, Polyglycerine and Fettsaure-Polyglycerinpartialester (Hestellung, Kennzahlen, DC-Trennung (partial translation).

*Primary Examiner*—Donald E. Czaja
*Assistant Examiner*—Evan Federman
*Attorney, Agent, or Firm*—John P. White

[57] ABSTRACT

A polyglycerol partial fatty acid ester emulsifier polyglycerol which is predominantly mono- and/or diesterified with saturated fatty acid moieties and optionally monomeric glycerol which is predominantly mono- and/or diesterified with saturated fatty acid moieties, in which the fatty acid moieties are selected so that the average number of carbon atoms in the acid moieties is in the range between 13.0 and 16.5 is prepared by reacting a polyglycerol, optionally containing monomeric glycerol, with a fatty acid or a mixture of fatty acids or with a fatty acid glyceride or a mixture of fatty acid glycerides, the number of carbon atoms of the fatty acid or of the fatty acid moiety of the glyceride or the average number of carbon atoms of the fatty acids moieties of the glycerides being in the range between 13.0 and 16.5.

4 Claims, No Drawings

EMULSIFIER AND A METHOD FOR ITS PREPARATION

The present invention relates to a polyglycerol partial fatty acid ester emulsifier, a method for the preparation thereof and a product containing such an emulsifier applied on a particulate carrier.

In the present context, the term "polyglycerol" designates condensed glycerol molecules, such as dimeric glycerol (diglycerol), trimeric glycerol (triglycerol), etc. Commercial glycerol condensate products or polyglycerol products useful for preparing the emulsifiers of the invention, such as products in which the major proportion is constituted by dimeric glycerol (diglycerol) are normally mixtures containing glycerol in varying amounts of polymerization, from monomeric glycerol up to tetrameric or higher glycerol condensates. Important examples of such polyglycerol products are products which contain, e.g., at the most 30% of monomeric glycerol, and very interesting products are products which contain at the most 25%, such as at the most 20%, of monomeric glycerol and about 60% of dimeric glycerol (diglycerol), the remainder being higher condensates of glycerol, but the composition of polyglycerol products may vary over a wide range.

Polyglycerol partial fatty acid emulsifiers comprising polyglycerol which is predominantly mono- and/or diesterified with saturated fatty acid moieties and optionally monomeric glycerol which is predominantly mono- and/or diesterified with saturated fatty acid moieties are normally used, e.g., as emulsifiers or "aerating agents" (aerating agent is a designation used in the food industry for an emulsifier which is used for whipping purposes, in other words for preparing emulsions where air constitutes the disperse phase) in food products, e.g. for preparing cake mixes, or as emulsifiers in ice cream or fine food products.

Such polyglycerol partial fatty acid emulsifiers are normally prepared by reacting a polyglycerol product with a fatty acid or a mixture of fatty acids or with a fatty acid glyceride or a mixture of fatty acid glycerides. The fatty acids or the fatty acid moieties in the fatty acid glycerides are saturated acids or moieties with an average number of carbon atoms in the range of 17–18, such as stearic acid or tallow fatty acids.

It has now surprisingly been found that the emulsifier or aerating properties of polyglycerol partial patty acid ester emulsifiers, in particular emulsifiers in which the major proportion of the polyglycerol is diglycerol, are improved considerably when the fatty acid moieties with which the polyglycerol and, if present, monomeric glycerol, is esterified, are selected so that the average number of carbon atoms in the acid moieties is in the range between 13.0 and 16.5

In the present context, the term "the average number of carbon atoms in the acid moieties" is intended to designate the average resulting from dividing the total number of carbon atoms in the acid moieties present as esterifying moieties on the polyglycerol and monomeric glycerol molecules with the total number of these esterifying moieties. As mentioned above, e.g., products which contain a predominant amount of diglycerol may typically contain an amount of monomeric glycerol and an amount of higher glycerol condensates (or higher glycerol condensates may be formed by condensation during the esterification process). In the normal preparation of the emulsifier product, both the monomeric glycerol and the glycerol condensates will become esterified, normally mono- and/or diesterified at terminal hydroxy groups.

In practice, there will substantially be concordance between the average carbon number of the acid moieties with which the diglycerol is esterified and the average carbon number of the acids or acid moieties of the acid or glyceride starting material used in the esterification in which the diglycerol partial fatty acid ester emulsifiers are made. Therefore, the average carbon number of the acid moieties of the esterified diglycerol molecules will, in practice, be substantially identical with the average carbon atom number of the acid moieties of the starting material used.

Preferred polyglycerol partial fatty acid ester emulsifiers of the invention are emulsifiers in which at the most 30% of the emulsifier consists of partial fatty acid esters of monomeric glycerol. Especially preferred emulsifiers of the invention are emulsifiers in which at least 50%, preferably at least 60%, of the emulsifier consists of diglycerol partial fatty acid esters, and at the most 25%, such as at the most 20%, consists of partial fatty acid esters of monomeric glycerol. These products are very interesting products as aerating agents for cake mixes.

It is preferred that at least 60%, in particular at least 80%, more preferably at least 90%, of the fatty acid moieties in the emulsifier contain at least 12 carbon atoms. The fatty acid moieties are saturated. A small percentage of unsaturated acid moieties may be present, but should preferably be less than 3%, more preferably less than 2%, and most preferably less than 1% by weight.

Very interesting products according to the invention are polyglycerol partial fatty acid ester emulsifiers, such as predominantly diglycerol partial fatty acid ester emulsifiers, in which the average number of carbon atoms of the acid moieties is in the range between 14.0 and 16.0, in particular in the range between 14.0 and 15.8, such as, e.g., in the range between 14.0 and 15.5

Acids which, either per se or combined with each other, will be useful for obtaining the average number of carbon atoms according to the invention are, e.g., lauric acid, myristic acid, palmitic acid, and stearic acid. In practice, it has been found that a very useful emulsifier or aerating agent is one in which 40-60%, preferably about 50%, of the fatty acid moieties are lauric acid moieties, and 25-50% are stearic acid moieties, 10-20% are palmitic acid moieties, and 0-3% are myristic acid moieties. Such a combination is obtained by esterifying with an about equal mixture of lauric acid and tallow fatty acids. A particular acid composition which is obtainable in this manner is one in which 40-60%, preferably about 50%, of the fatty acid moieties are lauric acid moieties, and 25-35% are stearic acid moieties, 10-20% are palmitic acid moieties and 0-3% are myristic acid moieties.

While the desired average carbon atom number of the acid moieties may result (when than one type of acid moiety is involved) as well from mixing polyglyceride partial fatty acid esters containing a low average carbon atom number in their acid moieties with polyglyceride partial fatty acid esters containing a high average carbon atom number in their acid moieties as from preparing the polyglyceride partial fatty acid esters directly by esterifying a polyglycerol product with the appropriate acid mixture or triglyceride mixture to result in the desired average carbon atom number, the latter is preferred, as such co-reaction has been found to result in much better emulsifier-aerating agent properties. Thus, a preferred method of preparing the emulsifiers of the invention is to react a polyglycerol, optionally containing monomeric glycerol, with a fatty acid or a mixture of fatty acids or with a fatty acid glyceride or a mixture of fatty acid glycerides, the number of carbon atoms of the fatty acid or of the fatty acid moieties of the glyceride or the average number of carbon atoms of the fatty acids or the fatty acid moieties of the glycerides being in the range between 13.0 and 16.5.

The reaction may be performed in a manner known per se, normally by heating the polyglycerol product with the fatty acid or mixture of fatty acids or the fatty acid glyceride or mixture of fatty acid glycerides at a relatively high temperature, such as a temperature in the range of 200°-270° C. in the presence of an amount of a basic catalyst. Another special method for preparing polyglycerol partial fatty acid esters which may also be used for preparing the emulsifiers of the invention is a method wherein the esterification is performed by reacting a polyglycerol product with fatty acid glycerides in tertiary butyl alcohol as the solvent. This method is described in European Patent No. 0 038 347.

The ratio between the starting materials in the process of the invention is suitably so selected that the resulting emulsifier product will be one in which the glycerol or polyglycerol moieties are predominantly mono- or diesterified and little or no higher esterified glycerol or polyglycerol molecules are formed. In practice, a suitable weight ratio between the patty acid component and the polyglycerol product component may be precalculated on the basis of the composition of the fatty acid component and the polyglycerol product component, based on the presumption that the degree of esterification will substantially correspond to the stoichiometric ratios in the starting reaction mixture. For most combinations of polyglycerol product and fatty acids, for example, the weight ratio between fatty acids and polyglycerol product will be of the order of less than 7:3, preferably less than 6:4, a preferred ratio often being of the order of 5.5:4.5. After the reaction, an excess of unreacted diglycerol may, if desired, be removed in a manner known per se. It is also possible to add monomeric glycerol to the product, if desired, in order to adjust the viscosity of the product.

The emulsifier of the invention is used in the same manner as known emulsifiers for the same purposes. Thus, for example, it may be added to the products or mixes to be emulsified or aerated in an amount of about 1-4% by weight, such as 1.5-3% by weight, such as about 2% by weight, calculated on the weight of the emulsifier relative to the weight of dry constituents of the products or mixes (i.e., e.g., for cake mixes, without the eggs and water added immediately before mixing). The emulsifier may be added to such cake mixes and similar mixes at the time when the mixes are mixed with eggs and water, or it may be added to the dry mix.

The invention also relates to a food product, in particular a cake mix or a cake product made therefrom, containing an emulsifier as defined above in particular in an amount of 1-4% by weight, calculated as stated above.

A preferred administration form of the emulsifier is as a free-flowing powder product.

It is known to prepare such free-flowing powder products by spray-drying or by application of the emulsifier on sucrose particles as a carrier. Thus, one known method for preparing such powders is to spray-dry an emulsion made from skim milk or whey and the emulsifier. However, a preferred administration form of the emulsifier is a substantially free-flowing emulsifier product in which the emulsifier is applied on a particulate carrier, preferably in an amount of at least 10% by weight, calculated on the weight of the product. The carrier is preferably of vegetable origin, and interesting carriers are carriers selected from flours, starches, mono- and disaccharides and pentosans and mixtures thereof, optionally with an admixture of material of vegetable fibre origin.

It is generally preferred that the carrier is one which contains or consists of starch.

As examples of such carriers which are of great interest in connection with surface-active substances for use in the food industry may be mentioned tuber starches or flours such as potato starch, batat starch and yam starch, sago starch, bean flour and pea flour, cereal starches or flours such as rice starch, wheat starch, rye starch, barley starch, oat starch, rice flour, wheat flour, rye flour, barley flour, oat flour, and maize starch, maltodextrins, dextrose, fructose, and mixtures thereof.

The particulate carriers are normally carriers, the particles of which have a particle size distribution with a major fraction having a size in the range of about 1–20 $\mu$m, in particular 1–10 $\mu$m. It is often preferred that the carriers have very small particle sizes, for examples with major particle size fractions in the range of 1–5 $\mu$m or less.

In the emulsifier products of the invention, the percentage of the emulsifier is normally in the range of 10–60%, such as 10–50%, and often preferably 15–50%, in particular 15–40%, calculated on the total weight of the emulsifier and the carrier.

The substantially free-flowing powder product having the above-described characteristics may be prepared by mixing the emulsifier with one or several particulate carriers and subjecting the resulting mixture to extrusion or an equivalent treatment to form a substantially free-flowing powder.

When the emulsifier and a suitable particulate carrier, in particular a carrier which is able to become "wetted with" or to "sorb" (adsorb and/or absorb) the emulsifier under the conditions prevailing, is subjected to extrusion, it is possible to obtain an extrudate which, instead of having the form of an extruded string of the mixture, immediately disintegrates into a powder product with highly desirable properties.

Suitable carriers are the ones mentioned above, in particular particulate carriers which are starches or flours. While these preferred carriers may be used as they are (with particle size distributions which often have a major fraction having a size in the range of about 1–20 $\mu$m and preferably 1–10 $\mu$m, but may also be somewhat larger, e.g. with major fractions of up to 20–50 $\mu$m or even 50–100 $\mu$m), it is contemplated that it may be advantageous to secure a very fine particle size of carriers, such as 1–5 $\mu$m or finer, by subjecting the carriers to additional comminution beyond the comminution which such products (for example flours or starches) have normally been subjected to. Such additional comminution may, e.g., be performed in a circular-chamber jet mill or a blender type mill. A typical example of Blaine value for wheat starch useful as a carrier is about 2500 $cm^2$/g, and for rice starch about 6000 $cm^2$/g. When emulsifier has been applied to such carriers, the Blaine values decrease somewhat, typically to, e.g., about 1100 cm²/g for a product containing 22.5% by weight of emulsifier and 77.5% by weight of wheat starch, and about 1700 cm²/g for a product containing 35% by weight of emulsifier and 65% by weight of rice starch.

The vegetable flour or starch carriers may, if desired, be combined with fibrous materials to obtain a starch or flour/fiber combination carrier, provided that the fibrous materials in the final product have about the same "particle" size (e.g. fiber length) as the flour or starch particles, such as a size in the range of 1–100 μm, in particular 1–20 μm, or less, such as explained above. The fibrous materials may be comminuted to such small sizes before they are added to the mixture, or they may be fibrous materials of such a brittle or weak character that they are comminuted to the small particle sizes mentioned during the mixing process. Examples of suitable fibrous materials for this purpose are brans such as wheat bran, rye bran, pea bran or bean bran. When finely divided fibrous materials are included in the carrier, it is preferred that they constitute at the most 50% by weight of the carrier material, preferably at the most 20% by weight of the carrier and most preferably at the most 5% by weight of the carrier.

The mixing of the constituents is suitably immediately prior to the extrusion in the mixing/transport means of the extruding equipment. This transport means is typically a screw mixer such as a double screw mixer. The temperature in the last part of the screw mixer (and hence approximately the temperature of the mixture subjected to extrusion) is normally in the range of 100°–180° C., typically 110°–150° C. and often preferably 120°–140° C. The orifice or each orifice through which the mixture is extruded will normally have a diameter of from about ½ to about 8 mm; often, a diameter of about 1–4 mm, such as about 2 mm, is very well suited.

The mixture subjected to the extrusion will normally have a free water content (water which is not chemically bound) of 1–30% by weight, especially 5–25% by weight. In certain cases it may be found advantageous to add a small percentage of water, such as 0.1–5% by weight, in particular 0.1–3% by weight, to the mixer together with the surface-active substance and the carrier.

EXAMPLE 1

An emulsifier product was prepared by heating 202.5 g of glycerol condensate mixture (comprising 15% of monomeric glycerol, 60% of diglycerol and the remainder being higher glycerol condensates), 247.5 g of a stearic acid product (containing about 70% by weight of stearic acid, 25% by weight of palmitic acid, and 5% by weight of myristic acid, average carbon atom number of the product: 17.2) and 2 g of sodium hydroxide to 230° C. and keeping the mixture at 230° C. for 20 minutes, whereafter the mixture was quickly cooled to just below 100° C. The resulting homogeneous, clear product was allowed to cool, whereby a yellow to light brown fat-like emulsifier product (in the following termed stearic acid diglycerol partial ester) was obtained.

Using exactly the same conditions and exactly the same amounts, but using, instead of the stearic acid product, myristic acid (99% by weight of myristic acid, carbon atom number: 14), another, yellow to light brown fat-like emulsifier product (in the following termed myristic acid diglycerol partial ester) was obtained. The saponification number of the product was 135–140.

The stearic acid diglycerol partial ester was mixed with the myristic acid diglycerol partial ester in the weight ratios 90:10 and 80:20, respectively (by melting and mixing), and the resulting mixtures, as well as each of the stearic acid diglycerol partial ester and the myristic acid diglycerol partial ester per se, were applied on rice starch as follows:

To an extruder of the type BC 45 supplied by Creusot-Loire, France, and comprising a double screw which rotates at a rotational speed of 200 r.p.m., and two nozzles of a diameter of 2 mm, part of the double screw length being cooled by means of a water jacket and the part of the double screw being adjacent to the nozzles being heated by means of an induction heating jacket, rice starch was supplied through an inlet funnel comprising two screws conveying the starch, and the diglycerol partial ester or diglycerol partial ester mixture in molten form was supplied to the double screw through a tube. Through another tube to the extruder, 1.5% of water (calculated on the same percentage basis as the diglycerol partial ester or mixture and the rice starch) was added. The weight ratio between the supply of diglycerol partial ester or mixture and the supply of rice starch was 35% of diglycerol partial ester or mixture to 65% of rice starch. The total amount supplied per hour was 45 kg.

The temperature of the screw part was thermostated to 130° C.

As a start up phase, a surplus of the diglycerol partial ester or mixture and the water was added, and the product emerged as a semi-liquid or pasty liquid or paste-like string. When the water and diglycerol partial ester or mixture supplied had been adjusted to the amounts referred to above, the product changed into a particulate free-flowing powder.

The product resulting from the extrusion was a free-flowing powder comprising the rice particles (or small agglomerates of particles) carrying the diglycerol partial ester or mixture.

Three further emulsifier products were prepared by esterification of the same glycerol condensate mixture in exactly the same manner as described above, but using, as the acid reactant, mixtures of the stearic acid product and the myristic acid in the weight ratios 90:10, 80:20, and 70:30, respectively. The resulting "co-reacted" products were applied on rice starch in exactly the same manner as described above.

57 g of each of the resulting rice starch-supported products was subjected to a whipping test in a layer cake mix of the following composition:
405 g of granulated sugar
270 g of wheat flour
188 g of wheat starch
30 g of baking powder
50 g of milk powder
350 g of whole egg
350 g of water.

The dry ingredients (i.e. all ingredients with the exception of egg and water) were mixed and sifted. The egg and water were stirred into the dry mixture on a Hobart-type planetary mixer for 1 minute at lowest speed setting, folowed by whipping at 264 r.p.m. for 3, 5 or 10 minutes, at which times the bulk weight was determined. The results appear from Table 1:

TABLE 1

| Ratio myristic acid: stearic acid product | Comment | Cake mix bulk weight, g/liter Whipping time | | |
|---|---|---|---|---|
| | | 3 min. | 5 min. | 10 min. |
| 0:100 | | 1030 | 1010 | 755 |
| 100:0 | | 335 | 335 | 360 |
| 90:10 | mixture | 380 | 345 | 350 |
| 80:20 | mixture | 470 | 400 | 365 |
| 90:10 | co-reacted | 360 | 365 | 345 |
| 80:20 | co-reacted | 320 | 315 | 335 |
| 70:30 | co-reacted | 350 | 335 | 335 |

It appears from Table 1 that the emulsifier made with the stearic acid product has poor whipping properties whereas the emulsifier made with myristic acid gives excellent whipping. Also, the mixture of 90% of the emulsifier made with myristic acid and 10% of the emulsifier made with the stearic acid product results in good whipping properties, whereas the whipping propreties are somewhat inferior when the stearic acid emulsifier proportion of the mixture is increased to 20%. It also appears that the co-reaction tends to result in better whipping properties. Thus, the product co-reacted with 80% of the myristic acid and 20% of the stearic acid product has much better whipping properties that the 80:20 mixture. It will also be noted that while the mixture product starts to result in poor whipping results already at the ratio 80:20, the co-reacted product gives excellent whipping properties at the ratio 70:30.

EXAMPLE 2

In the same manner as described in Example 1, mixtures of myristic acid and the stearic acid product were reacted with diglycerol to result in co-reacted products. After the reaction, unesterified glycerol and glycerol condensate were removed from the reaction mixture. Each of the resulting emulsifiers was applied on icing sugar in an amount of 10% of emulsifier on 90% of the sugar by melting the emulsifier and adding the sugar. Then, each resulting coarse powdery product was passed through a sieve to yield a free-flowing powder. After standing for about 24 hours, each product was again passed through a sieve and was then subjected to the same whipping test in the same layer cake mixture as described in Example 1. The results appear from Table 2:

TABLE 2

| Ratio myristic acid: stearic acid product, co-reacted | Cake mix bulk weight, g/liter Whipping time | | |
|---|---|---|---|
| | 3 min. | 5 min. | 10 min. |
| 100:0 | 360 | 315 | 355 |
| 90:10 | 335 | 305 | 305 |
| 80:20 | 335 | 295 | 300 |
| 70:30 | 320 | 295 | 285 |
| 60:40 | 360 | 315 | 285 |
| 50:50 | 350 | 305 | 275 |
| 40:60 | 330 | 315 | 285 |
| 20:80 | 565 | 415 | 300 |
| 10:90 | 630 | 440 | 285 |

In the same manner, a co-reacted 50:50 myristic acid: fully hardened tallow fatty acids product was prepared and tested. The whipping results were: 3 minutes: 350 g/liter, 5 minutes: 305 g/liter, and 10 minutes: 280 g/liter, in other words almost identical to the results stated above, although the tallow fatty acids procduct introduces a small extra amount of glycerol.

EXAMPLE 3

In the same manner as described in Example 2, co-reaction emulsifiers were made with mixtures of the myristic acid and 99% palmitic acid. After the reaction, the unesterified glycerol and glycerol condensate were removed from the reaction mixture. The resulting products were applied on sugar as described in Example 2 and subjected to the whipping test in the same manner as described in Example 1. The results appear from Table 3.

TABLE 3

| Ratio myristic acid: palmitic acid, co-reacted | Cake mix bulk weight, b/liter Whipping time | | |
|---|---|---|---|
| | 3 min. | 5 min. | 10 min. |
| 100:0 | 350 | 310 | 355 |
| 90:10 | 335 | 305 | 345 |
| 80:20 | 330 | 305 | 330 |
| 70:30 | 340 | 305 | 315 |
| 60:40 | 325 | 320 | 305 |
| 50:50 | 335 | 315 | 305 |
| 40:60 | 330 | 335 | 305 |
| 30:70 | 325 | 320 | 290 |
| 20:80 | 330 | 335 | 315 |
| 10:90 | 330 | 335 | 305 |

EXAMPLE 4

An emulsified product was prepared by heating 19.92 kg of the same glycerol condensate mixture as in Example 1, 0.33 kg of glycerine, 12.38 kg of lauric acid (99%) and 12.38 kg of the same stearic acid product as in Example 1 at 225°–230° C. for 40 minutes. During the heating, 1.4 kg of reaction water was removed. (The reaction was obtained without addition of catalyst; the amount of catalyst present in the glycerol condensate mixture). The mixture was then quickly cooled to just below 100° C. The resulting homogeneous, clear product was allowed to cool, whereby a yellow light brown fat-like emulsified product was obtained. The saponification value of the product was 141.7, the acid number was 2.7, and the pH was 7.2. A melting point determination in capillary tube gave the following result: Clarification point 38.5° C., rising point 61° C.

This co-reacted emulsifier product was applied on rice starch in an extruder in the same manner as described in Example 1. In one experiment, 35% of the emulsifier was applied on 65% of rice starch with addition of 1.5% of water. In another experiment, 35% of the emulsifier was applied on 65% of rice starch without addition of water. In a third experiment, 39.2% of the emulsifier was applied on 60.8% of rice starch without addition of water.

Each of the rice starch-supported products was subjected to the same whipping test in the same layer cake mixture as described in Example 1. Each product was mixed with the other ingredients, and part of the resulting mixture was immediately whipped. Another part of the emulsifier-containing mix (dry) was stored for three months at room temperature, whereafter it was whipped. The results of the whipping tests appear from Table 4:

TABLE 4

| Co-reacted 50:50 lauric acid:stearic acid product | Cake mix bulk weight, b/liter | | |
|---|---|---|---|
| | Whipping time | | |
| | 3 min. | 5 min. | 10 min. |
| 35% emulsifier, 65% rice starch, prepared using 1.5% of water | | | |
| Mix fresh prepared | 335 | 335 | 355 |
| After three months | 340 | 355 | 380 |
| 35% emulsifier, 65% rice starch, without water | | | |
| Mix fresh prepared | 325 | 330 | 345 |
| After three months | 345 | 350 | 360 |
| 39.2% emulsifier, 60.8% rice starch, without water | | | |
| Mix fresh prepared | 350 | 330 | 340 |
| After three months | 335 | 340 | 365 |

It appears from the results that the emulsifier has excellent whipping properties, and that these excellent whipping properties are retained even when the emulsifier, mixed with the cake mix, is stored for a long period at room temperature.

EXAMPLE 5

In the manner as described in Example 4, a series of emulsifiers were prepared in large scale with four different acid reactants: 99% lauric acid; the stearic acid product described in Example 1; 99% myristic acid; and 99% palmitic acid. The glycerol condensate mixture was the same as in Example 1. The weight ratio between the acid reactant and the glycerol condensate mixture was 55:45. As catalyst, 0.44% of sodium hydroxide was used, calculated on the reactants.

Each of the resulting emulsifier products was applied in an amount of 35% on 65% of rice starch in the same manner as described in Example 1, using 1.5% of water and no water, respectively. The results of the whipping tests appear from Table 5.

TABLE 5

| Emulsifier product | Whipping time | | |
|---|---|---|---|
| | 3 min. | 5 min. | 10 min. |
| lauric acid product | | | |
| applied on rice starch, with water | 665 | 730 | 710 |
| applied on rice starch, without water | 525 | 630 | 695 |
| stearic acid product | | | |
| applied on rice starch, with water | 900 | 750 | 475 |
| applied on rice starch, without water | 910 | 735 | 490 |
| myristic acid product applied on rice starch, with water | | | |
| fresh mix | 335 | 335 | 360 |
| after three months storage in the cake mix | 420 | 390 | 365 |
| palmitic acid, applied on rice starch, with water | | | |
| fresh mix | 395 | 365 | 330 |
| after three months | 530 | 430 | 355 |

EXAMPLE 6

An emulsifier product was prepared by heating 57.8% of a glycerol condensate mixture having a viscosity of 1000 cps at 60° C. and having the following average composition:

| Monomeric glycerol | 21.5% |
|---|---|
| Diglycerol | 26.3% |
| Trimeric condensate | 19.1% |
| Tetrameric condensate | 12.1% |
| Pentameric condensate | 7.4% |
| Higher condensates | 13.6% |

The above product was esterified with myristic acid. The weight ratio between the glycerol condensate product and the myristic acid was 57.8:42.2. No catalyst was added (the samll amount of catalyst present in the polyglycerol product was sufficient). The mixture was kept at 265° C. for 20 minutes whereafter it was quickly cooled to just below 100° C. The resulting homogeneous, clear product was allowed to cool, whereby a yellow to light brown fat-like emulsifier product was obtained. Unesterified glycerol and glycerol condensate were removed from the product. The data of the product were as follows: Before removal of unreacted glycerol and glycerol condensate: Saponification value 111.5; acid number 0.9; pH 7.6. After removal of unreacted glycerol and glycerol condensate: Saponification value 150.5, acid number 9.2.

In the same manner, another product was made using the same glycerol condensate mixture, but using a 80:20 mixture of myristic acid (99%) and the stearic acid product described in Example 1 as the acid reactant. The data of the resulting emulsifier product were as follows: Before removal of unesterified glycerol and glycerol condensate: Saponification value 134.8; acid number 2.9; pH 8.5. After removal of unesterified glycerol and glycerol condensate: Saponification value 163.3; acid number 10.9.

Each of these emulsifier products (from which unreacted glycerol and glycerol condensate have been removed) was applied in an amount of 10% on 90% of icing sugar as described in Example 2, and the sugar-supported products were subjected to the same whipping tests in the same layer cake mixture as described in Example 1. The results appear from Table 6:

TABLE 6

| | Cake mix bulk weight, b/liter | | |
|---|---|---|---|
| | Whipping time | | |
| Product | 3 min. | 5 min. | 10 min. |
| Prepared with myristic acid | 500 | 465 | 465 |
| Prepared with 80:20 mixture of myristic acid and stearic acid product | 650 | 560 | 410 |

These results are much better than results obtained with the same glycerol condensate reacted in the same manner with the stearic acid product alone.

We claim:

1. A method for preparing a free-flowing emulsifier product containing a polyglycerol partial fatty acid ester emulsifier comprising polyglycerol which is monesterified or diesterified with saturated fatty acid moieties, in which the fatty acid moieties are selected so that the average number of carbon atoms in the acid moieties is in the range between 13.0 and 16.5, which method comprises mixing the emulsifier with a particulate carrier and subjecting the resulting mixture to extrusion.

2. A method according to claim 1, in which the temperature of the mixture subjected to extrusion is in the range of 100°–180° C.

3. A method according to claim 2, in which the temperature of the mixture subjected to extrusion is in the range of 110°–150° C.

4. A method according to claim 3, in which the temperature of the mixture subjected to extrusion is in the range of 120°–140° C.

* * * * *